July 16, 1946.    G. C. WICKS    2,404,336
ELECTRIC HEATER
Filed Jan. 22, 1944    2 Sheets-Sheet 1
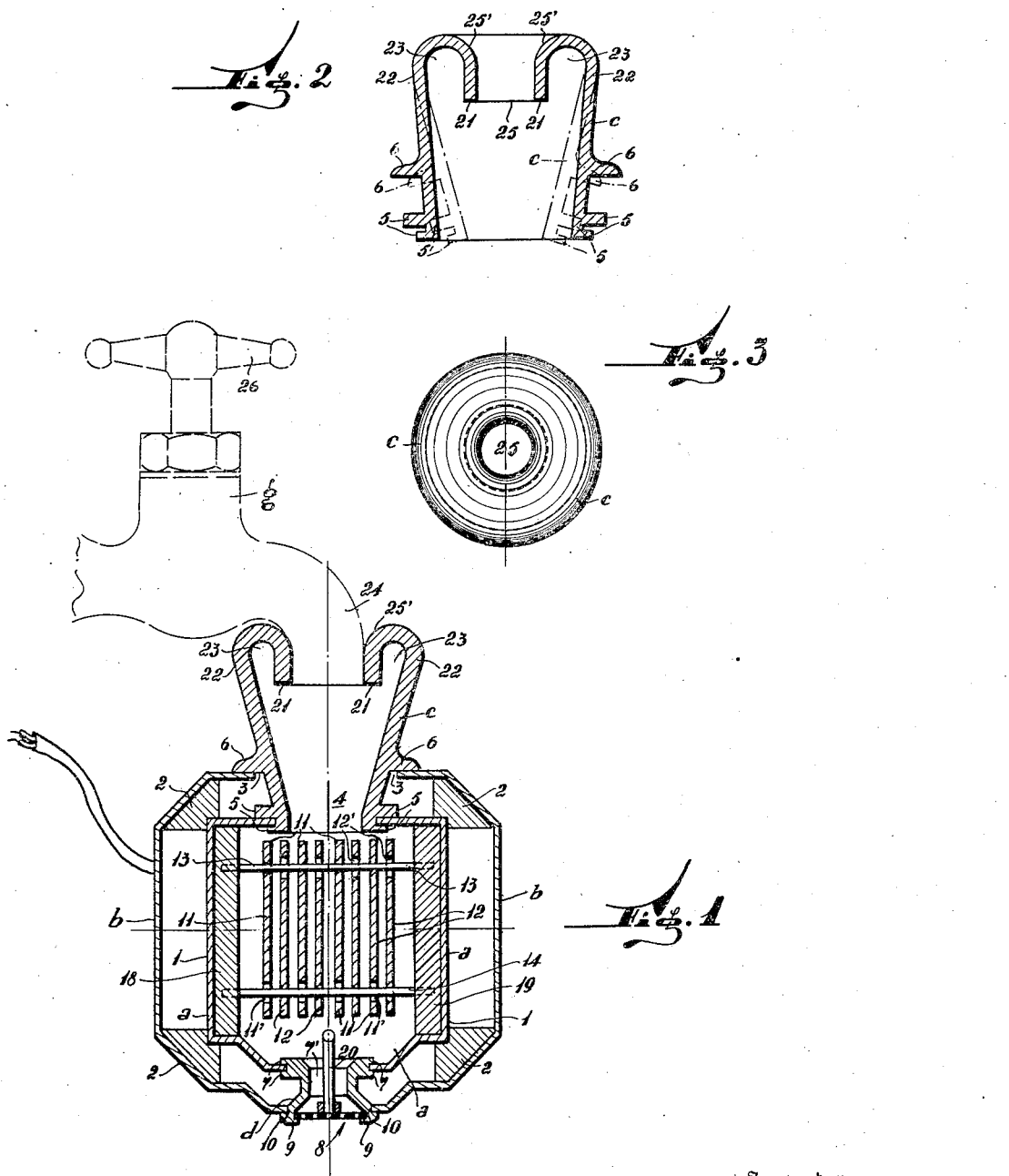
Inventor
Geraldo Cyro Wicks July 16, 1946.                G. C. WICKS                 2,404,336
                              ELECTRIC HEATER
                       Filed Jan. 22, 1944          2 Sheets-Sheet 2
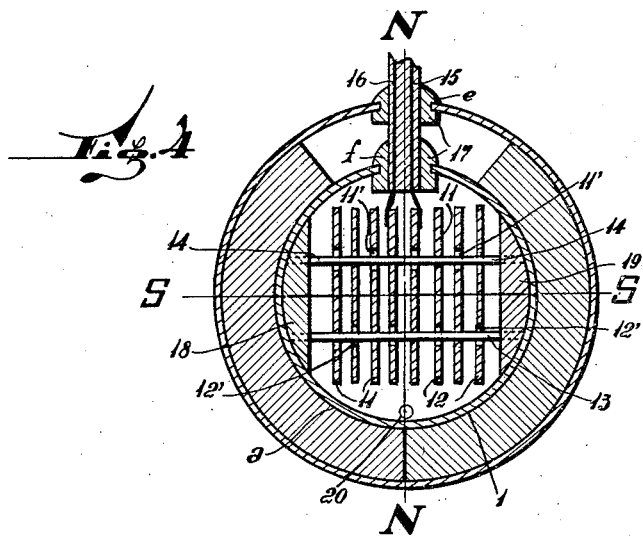
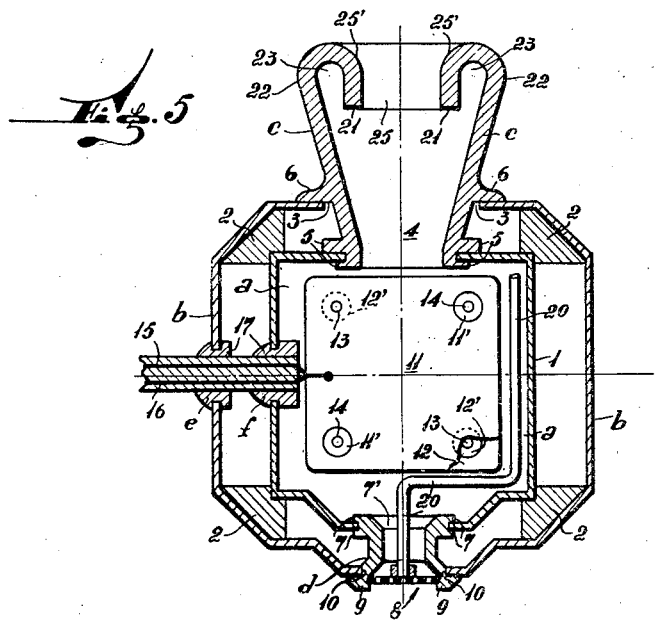
Inventor
Geraldo Cyro Wicks Patented July 16, 1946

2,404,336

UNITED STATES PATENT OFFICE 2,404,336

ELECTRIC HEATER

Geraldo Cyro Wicks, Ramos Mejia, Argentina

Application January 22, 1944, Serial No. 519,329

6 Claims. (Cl. 219—40)

This invention relates to a novel and improved electric water heater and has for its object to provide a practical device of this kind suitable for supplying limited amounts of warm water for any desired use.

Other objects of the invention are safety of operation and complete security of insulation.

A further object of the invention is to ensure an even, efficient and speedy heating of the water passed through the heater.

Still another object consists in ensuring a maximum use of the electric energy consumed with regard to the yield, so as to render the service as economic as possible.

A still further object of the invention is to provide a water heater of great durability and in which the danger of short circuits is practically eliminated.

Other objects of the invention will appear in the course of this specification, considered in connection with the accompanying drawings which show by way of example and for facilitating the understanding of the same, a preferred embodiment of the heater in accordance with this invention. In said drawings:

Figure 1 represents the novel heater in sectional view, taken on the line S—S of Figure 4, showing the simple arrangement of the electrodes and mounting of the same, as well as the manner of insulating the heating chamber with regard to the outer casing.

Figure 2 is a vertical section of the disengaged mouthpiece, showing the alteration allowed by its resiliency, in order to ensure a tight connection with the inlet end of the heater.

Figure 3 is an upper plan view of said mouthpiece.

Figure 4 shows a cross section of the heater, illustrating the arrangement of the electrodes for ensuring their action on the water in contact with almost the entire surface of the plates forming said electrodes, and Figure 5 is another sectional view of the heater, taken on the line N—N of Figure 4.

Similar letters and numbers of reference have been used to indicate like or corresponding parts in all the several views.

With reference to the drawings, $a$ indicates the heating chamber, formed by metallic walls 1, insulated from the outer casing $b$. To obtain said insulation, the chamber $a$, of smaller dimensions than the casing $b$, is arranged within this latter with a suitable spacing all around, assured by means of spacing members 2, formed by rings or segments of insulating material which engage by suitable notches with corresponding projections on the wall 1 of the chamber $a$, as shown in Figures 1 and 5.

The inlet opening of the heater is formed by the mouthpiece $c$ of rubber or similar resilient material, of particular configuration which allows of the same being tightly connected to a faucet or other suitable delivery device of a water main.

The mouthpiece $c$ extends into the casing $b$ through the opening 3 and projects with its lower end into the inlet opening 4 of the chamber $a$. The coupling is established by means of a rim with double flanges 5 of said mouthpiece which forms a tight fit with said inlet opening 4 for supplying the water to be heated to the interior of the chamber $a$. The mouthpiece $c$ is formed with an annular flange 6 which applies against the upper edge of the inlet 3 and thus serves as a sealing member for the same.

The outlet end of the chamber $a$ is formed by a lower mouthpiece $d$, applied by means of a double rim or lip to the edge of the opening 7′, proper of said outlet so as to form a tight joint. As may be seen with reference to Figures 1 and 5, the said bell shaped mouthpiece $d$ holds a perforated shower disc 8. The mouthpiece $d$ with its edge 9 fits against the edge of the opening 10, formed in the bottom of the casing $b$. The outlet of the mouthpiece $d$ is of smaller cross-section than that of the inlet $c$, thereby causing the water, by accumulation, to fill the entire cavity of the chamber.

The mouthpiece $d$ is constructed of dielectric material, so that the wall 1 of the chamber $a$ is perfectly insulated with respect to the wall of the casing $b$, said insulation being thermic as well as electric, so that the phenomena of the chamber $a$ will not be transmitted to the casing $b$.

As the electric heater according to this invention is of the type in which the inflowing water acts as an ohmic resistance to perform its own heating, a plurality of electrodes, grouped in two series 11 and 12, is provided in the interior of the chamber $a$. Said electrodes consist of metallic plates of similar or equivalent shape, arranged to register exactly with one another, so that the gaps formed between the electrodes of one series and those of the other will be fully utilized for heating.

To that end, the electrode plates 11 and 12 are provided with series of holes 11′, 12′; the holes 11′ do not correspond with the holes 12′, but, on the one hand, all the several series of holes 11′ register one with another, along the same line, while on the other, all the series of holes 12' along the same line, register one with another, as may be seen by referring to the several figures.

Suitable rods 13 extend through said holes 12' and as their sectional diameter is considerably less than that of the holes 12', when passing through the centre of these latter, the conducting rod will not come into contact with the electrodes 12. However, the rods 13, at their passage through the electrodes 11, are closely joined thereto and thereby establish the connection between said rods 13 and the entire series of electrodes 11.

On the other hand, through the holes 11' extend rods 14, of a smaller section than the diameter of said holes, so that at their passage through the centre of these latter, the rods 14 will not touch the electrodes 11, but where they pass through the electrodes 12, they are closely joined to the same and thus establish a connection between said rods 14 and the entire series of electrodes 12.

The series of electrode plates 11 and 12 are respectively connected to the leads 15 and 16 which enter through eyelets e, f, of dielectric material which form annular insulators 17 for conveniently holding said leads and preventing any movement of their outer portions from being transmitted to their inner ends.

The rods 13 and 14 are embedded in and supported by standards 18 and 19 of insulating material, conveniently applied to the walls of the casing a, so as to fit the contour thereof. By so embedding the rods 13 and 14 in the standards 18 and 19, at both ends of said rods, the latter will act as stay bars for their respective electrodes, i. e., the rods 13 will support the electrodes 11, while the rods 14 will support the electrodes 12. Since each support rod for the electrodes of one series is separated from the electrodes of the other series by a free space at least approximately equal to the distance between adjacent electrodes, the danger of short circuits over scale deposits is substantially eliminated.

From a point near the top of the heating chamber a a small tube 20 leads to the centre of the shower disc 8. The object of said tube is to serve as a vent permitting the escape of air and of surplus steam, as the heater chamber is filled with water, and also as a drainage means for carrying away the steam which might be left in said chamber, produced by the last portion of water introduced. In view of the absence of a switch in the electric circuit, the operation of the faucet, besides regulating the amount of water allowed to pass, serves to control the heater, and simultaneously with the stopping of the supply of water, the electric circuit will be opened, owing to the fact that after the water has run out, the electrode plates will be insulated by the gap between the same.

As already stated, the mouthpiece c, of rubber or other suitable resilient material, has its upper part shaped as an inverted cup, with its extended end folded backward an inward, so as to form a rim or lip 21 which extends in a downward direction within the mouthpiece.

Owing to its particular configuration, the lip 21 is held at a certain distance from the inner wall 22 of the mouthpiece, so that between said lip and the wall an annular space 23 is formed, of sufficient dimensions for allowing said lip 21 to expand from its normal condition, shown in Figure 2, to that illustrated in Figure 1, in which the mouthpiece c is telescoped over the delivery end 24 of a faucet g, of a larger section than that of the mouth 25 normally formed by the lip 21 when in its inoperative position, as shown in Figures 2 and 3.

Under these conditions, when telescoping the mouthpiece c on to the faucet as indicated in Figure 1, the lip 21 will expand and owing to the resiliency of the rubber, will form an effective and tight seal, of sufficient gripping capacity for holding and supporting the weight of the device, without risk of the telescopic connection between the mouthpiece and the outlet of the faucet being altered when starting the operation of the device.

On the other hand, as the water is allowed to pass by the operation of the handle 26, the fluid will gravitate by its pressure in all directions, so as to increase the section of the cavity and thus apply an additional gripping pressure to the telescopic connection and render its disengagement practically impossible, to such an extent that when it is desired to disconnect the mouthpiece, the faucet must first be closed, in order to reduce the pressure of the water on the walls of the device, as above set forth. It will be evident that the same gripping pressure will also cause a perfectly tight seal between the respective parts.

Owing to the configuration of the walls of the mouthpiece c being of a high degree of curvature, as indicated in Figures 1, 2 and 5, the inlet 25 is formed with a flared portion 21', to facilitate its application by telescoping to the delivery portion 24 of the faucet and render the device of a practically removable nature.

From the foregoing it will be seen that the heater above described, provided with its mouthpiece c, is essentially a portable device and adapted to be applied to any delivery nozzle of a water main, and after simply plugging the leads 15 and 16 in circuit, the heater will be ready for operation after turning the handle 26 of the faucet.

The operation of the heater is most simple, being caused by the action of the water as a resistance, with a suitable effective yield, owing to the arrangement of the electrode plates 11 and 12, which by their convenient shape, dimensions and alternate position cause the surface of one to cooperate with that of another, across the space separating the same, so that by the use of a limited number of plates a free and sufficient flow of water is obtained while assuring at the same time, the desired degree of heating.

Owing to the outlet d being of smaller section than the inlet c of the mouthpiece, it will be apparent that the water entering into the chamber a, will accumulate and be retained during the short delay of time necessary for becoming heated.

It will be seen that the novel heater consists of two series of electrode plates, strictly separated and intercalated, its main feature consisting in such a construction and arrangement of the same that they will all occupy, after the manner of partitions, the same order, each plate opposing with its surfaces the adjacent surfaces of the other series, with the plates of one series mounted and intercalated by means of distinct members, so as to insulate the members or plates of one series with regard to the plates of the other series, but all arranged in the direction of flow of the water so as to permit gravitational flow of water from each of the spaces between two adjacent electrodes to the outlet opening. Thus, the water flows continuously through the heater and no residual water is retained in the heater chamber or in any pocket thereof when the supply of water is cut off.

It will be understood that when carrying the invention into practice, several modifications of construction and shape might be introduced into the heater as above described, without departing from the scope of the following claims.

I claim:

1. An electric water heater comprising a heater chamber provided with an inlet opening in its top and an outlet opening of smaller cross-section in its bottom, electric water heating means in said heater chamber including two series of spaced electrodes for passing current through water introduced into said chamber, an outer casing enclosing said heater chamber, insulating spacer members between the walls of the heating chamber and those of the outer casing, and dielectric mouthpieces passing through corresponding aligned holes in said outer casing into said inlet and outlet opening, respectively, of said heater chamber.

2. An electric water heater comprising a heater chamber provided with an inlet opening at its top and an outlet opening of smaller cross-section at its bottom, an electric water heating unit in said heater chamber including a first series of uniformly spaced electrodes and a second series of electrodes alternating with and uniformly spaced from the electrodes of said first series, said electrodes being shaped and arranged to permit gravitational flow of water from each of the spaces between two adjacent electrodes to said outlet opening, means connecting said two series of electrodes, respectively, to opposite terminals of a source of current, and a venting conduit of comparatively small cross-section leading from the upper portion of said heating chamber to said outlet opening.

3. An electric water heater comprising a heater chamber provided with an inlet opening at its top and an outlet opening of smaller cross-section at its bottom, an electric water heating unit in said heater chamber including a first series of parallel, uniformly spaced, vertically arranged electrode plates extending between two horizontal planes shortly above the bottom and below the top, respectively, of said heater chamber, and a second series of electrode plates arranged in parallel and alternate relationship to and uniformly spaced from the electrode plates of said first series and extending between the same two horizontal planes, means connecting said two series of electrode plates, respectively, to opposite terminals of a source of current, and a venting conduit of comparatively small cross-section leading from the upper portion of said heater chamber to said outlet opening.

4. An electric water heater comprising a heater chamber provided with an inlet opening at the top and an outlet opening of smaller cross-section at its bottom, an electric water heating unit in said heater chamber spaced from the interior walls of the latter and including a first series of uniformly spaced electrodes and a second series of electrodes alternating with and uniformly spaced from the electrodes of said first series, said electrodes being shaped and arranged to permit gravitational flow of water from each of the spaces between two adjacent electrodes to said outlet opening, electro-conductive means to support each of said series of electrodes independently of the other, the support means for each series of electrodes being separated from the electrodes of the other series by a free space of a width at least approximately equal to the distance between two adjacent electrodes, means connecting said two series of electrodes, respectively, to opposite terminals of a source of current, and a venting conduit of comparatively small cross-section leading from the upper portion of said heater chamber to said outlet opening.

5. An electric water heater comprising a heater chamber provided with an inlet opening and an outlet opening of smaller cross-section, an electric water heating unit in said heater chamber spaced from the interior walls of the latter and including a first series of parallel electrode plates, a second series of parallel electrode plates alternating with and uniformly spaced from the electrode plates of said first series, the plates of both said series having the same substantially rectangular shape and being arranged in exact register with one another, four electroconductive support rods passing at right angles through said plates near the four corners thereof, one pair of rods passing through two diagonally opposed corners of the plates being in contact with the plates of one series and passing through recesses provided in the plates of the other series, the other pair of rods being in contact with the electrodes of the second series and passing through recesses provided in the plates of said first series, and means connecting said two series of electrodes, respectively, to opposite terminals of a source of current.

6. An electric water heater comprising a heater chamber provided with an inlet opening at its top and with an outlet conduit of smaller cross-section having an opening disposed in said chamber at a considerably lower level, an electric water heating unit in said chamber including at least one pair of spaced apart electrodes disposed above the level of said opening, said electrodes being shaped and arranged to permit gravitational flow of water from the space therebetween, means to connect the two electrodes of said pair to opposite terminals of a source of current, and a venting conduit of comparatively small cross-section leading from the upper portion of said heating chamber to said outlet conduit.

GERALDO CYRO WICKS.